United States Patent [19]
Meyer et al.

[11] Patent Number: 6,044,111
[45] Date of Patent: Mar. 28, 2000

[54] EQUALIZER WITH A SEQUENCE ESTIMATION METHOD WITH STATE REDUCTION FOR A RECEIVER IN A DIGITAL TRANSMISSION SYSTEM

[75] Inventors: Raimund Meyer, Nürnberg; Robert Fischer, Erlangen; Wolfgang Gerstacker, Nürnberg; Johannes Huber, Langensendelbach; Peter Schramm, Hummeltal, all of Germany

[73] Assignee: U.S. Philips Corporation, New York, N.Y.

[21] Appl. No.: 08/973,023

[22] PCT Filed: Apr. 7, 1997

[86] PCT No.: PCT/IB97/00361

§ 371 Date: Nov. 26, 1997

§ 102(e) Date: Nov. 26, 1997

[87] PCT Pub. No.: WO97/39550

PCT Pub. Date: Oct. 23, 1997

[30] Foreign Application Priority Data

Apr. 12, 1996 [DE] Germany .................. 196 14 544

[51] Int. Cl.⁷ .............. H03H 7/30; H03H 7/40; H03K 5/159
[52] U.S. Cl. .............. 375/231; 375/232; 364/724.2
[58] Field of Search ............... 375/229, 230, 375/231, 232, 233, 234, 235, 236, 316, 340, 341, 346, 348, 350; 364/724.19, 724.2

[56] References Cited

U.S. PATENT DOCUMENTS

| | | | |
|---|---|---|---|
| 5,307,374 | 4/1994 | Baier | 375/229 |
| 5,673,294 | 9/1997 | Namekata | 375/341 |
| 5,867,538 | 2/1999 | Liu | 375/341 |
| 5,887,035 | 3/1999 | Molnar | 375/340 |

OTHER PUBLICATIONS

Duel–Hallen et al, "Delayed Decision–Feedback Sequence Estimation" IEEE Transactions on Communications, vol.37, No.5, May, 1989.

Muller et al., "Reduced–State Soft–Output Trellis Equalization incorporating Soft Feedback", May, 1996.

Primary Examiner—Chi H. Pham
Assistant Examiner—Bryan Webster
Attorney, Agent, or Firm—Dicran Halajian

[57] ABSTRACT

The invention relates to a digital transmission system having a receiver which includes an equalizer for estimating transmitted binary symbols, from a sequence of sample values (6) of a received signal distorted by a transmission channel, by a reduced-state sequence estimation method or a reduced-state single symbol estimation method (11). To provide a receiver featuring high reliability combined with a clear state reduction of the estimation method, a minimum-phase substitute system (14) distorts the sample values received after received after a known training sequence (27) in the sequence of sample values (6)in the received order, and a maximum-phase substitute system (14) distorts the sample values (6) received before a known training sequence (27) and to be processed in reverse order for forming an estimate (11) for a received signal. The number coefficients of the impulse response which are reduced by the state reduction and used for the estimation, render the estimation inaccurate. In a minimum-phase system, the first coefficients of the impulse response of the substitute system have maximum energy with an unchanged frequency response. When these coefficients transformed in this manner are used for the state reduction, nearly all of the information is used for the estimation. This achieves a high reliability of the sequence estimation as is achieved when all the states are used.

5 Claims, 2 Drawing Sheets

EQUALIZER WITH A SEQUENCE ESTIMATION METHOD WITH STATE REDUCTION FOR A RECEIVER IN A DIGITAL TRANSMISSION SYSTEM

BACKGROUND OF THE INVENTION

1. Field of the Invention

The invention relates to a digital transmission system comprising a receiver, to receiver including an equalizer for estimating transmitted binary symbols from a sequence of sample values of a received signal distorted by a transmission channel, by implementing a reduced-state sequence estimation method or reduced-state single symbol estimation method.

Furthermore, the invention relates to a receiver which includes an equalizer for estimating transmitted binary symbols from a sequence of sample values of a received signal distorted by a transmission channel, by implementing a reduced-state sequence estimation method or reduced-state single symbol estimation method.

2. Description of the Related Art

Such receivers are used, for example, in digital mobile radio according to the GSM standard. According to the GSM standard, digital signals are transmitted in a TDMA method by a GMSK modulation. The data transmission is then influenced by a time-variant transmission channel. More particularly, multipath propagation and reflections determine differences of delay and phase shifts for the transmitted digital data symbols in the received signal and lead to a superpositioning of adjacent data symbols. The fact that a received signal for a data symbol, is influenced by d previous data symbols is known as intersymbol interference (ISI). Then d is an integer defining the memory depth of the transmission channel.

For the equalization of the received signal which is linearly distorted as a result of multipath propagation and transmitting-end and receiving-end band limitation filters (intrinsic impulse noise with linear demodulation of the GMSK signal), the receiver is to be adapted, for data reconstruction, to the respective time-variant transmission properties of the transmission channel. Therefore, an estimation is made of the respective impulse response of the currently distorting transmission system, this system comprising not only the transmission channel, but also the influences of the GMSK modulation and a receiver input stage which produces sample values of the received digital signal. For this purpose, a substitute system describing the transmission system is formed, with the aid of which, estimated impulse response data are estimated according to the Maximum Likelihood Sequence Estimation (MLSE) method via the execution of a Viterbi algorithm, more particularly, a soft-output Viterbi algorithm, or a single symbol estimation method.

With this method, the most probable transmit sequence is determined from all possible data sequences, while taking into account the received sequence and the estimated impulse response of the transmission system. More particularly, the Viterbi algorithm is suitable for estimating the data symbols according to the MLSE method. The Viterbi algorithm is known from "The Viterbi algorithm", G. D. Forney, Jr., IEEE Proceedings, vol. 61, pp. 268–278, 1973. Additional information to the hard-decision estimates of data symbols is produced by the Soft-Output Viterbi Algorithm, which is known, for example, from "A Viterbi algorithm with soft-decision outputs and its applications", J. Hagenauer and P. Höher, Proceedings of the GLOBECOM 1989, pp. 47.1.1–47.1.7, Dallas, 1989. With single symbol estimation, optimum maximum a-posteriori symbol-by-symbol decoder algorithms are used according to "Optimal decoding of linear codes for minimizing symbol error rate", L. R. Bahl, J. Cocke, F. Jelinek, and J. Raviv, IEEE Transactions on Information Theory, IT-20: pp. 284–287, 1974, or modification of this algorithm, respectively, found in "Optimum and Sub-Optimum Detection of Coded Data Disturbed by Time-Varying Intersymbol Interference", W. Koch and A. Baier, Proceedings of the GLOBECOM 1990, pp. 807.5.1–807.5.6, San Diego, December 1990. With an equal value of the estimation of the received signals, the manufacturing costs of the equalizer in a first approximation proportionally rise by $2^d$ i.e., they rise exponentially with the depth d of the memory of the transmission channel. In a sequence estimation method with a complete or reduced number of states, the substitute system actuated by binary symbols, this substitute system describing the effect of signal distortions as a result of multipath propagation and the effect of intrinsic impulse noise, is considered a so-called finite state machine or a trellis coder respectively, in whose associated trellis diagram, the binary symbol sequences are represented as paths. This is described, for example, in "Trelliscodierung in der digitalen Übertragungstechnik—Grundlagen und Anwendungen", J. Huber, Springer Verlag, Berlin 1992. The object of the sequence estimation method is to determine, on the basis of a sequence of sample values of the received signal, the binary symbol sequence transmitted most probably. The implementation expenditure necessary for this purpose is proportional to the number of memory states of the finite-state machine, this number rising exponentially with the degree of the substitute system and thus, with the maximum delay difference in the multipath propagation of the signal. For sequence estimation methods having a reduced number of states, the number of states is subdivided into classes for which each state class forms a so-called hyperstate with respect to the sequence estimation method. The reduction of expenditure is then that the sequence estimation method is executed only more in the Trellis diagram for the hyperstates. Embodiments for this are contained in, for example, "Trelliscodierung in der digitalen Übertragungstechnik—Grundlagen und Anwendungen", J. Huber, Springer Verlag, Berlin, 1992. Together with the decisions which path to a hyperstate has maximum probability, the actual state of the trellis coder, the so-termed sub-state in a hyperstate, is determined at the same time. A correct determination of the probabilities for the next steps in the trellis diagram, the so-termed metric, becomes possible in this manner. It is advantageous to combine the states to a hyperstate in which the binary symbols stored in the substitute system are only different in the last d-r; $0 \leq r < d$ register cells, where d indicates the degree of the substitute system. In this manner, the number of states is reduced from $2^d$ to $2^r$ hyperstates, while each hyperstate includes $2^{d-r}$ sub-states. Thus the expenditure as against a sequence estimation with the complete number of states is reduced by the factor $2^{d-r}$.

European Patent Application corresponding to U.S. Pat. No. 5,307,374 discloses EP-0 488 456 A2 a maximum likelihood receiver which also uses a sequence estimation with a reduced number of states in the equalizer. The variance of the estimation error is then increased for an estimated sequence of binary symbols, because a shortened impulse response of the substitute system is used for the sequence estimation. Since a smaller number of coefficients is available when a sequence is to be estimated with a reduced number of states for the path distinction in the trellis diagram, the reliability of the sequence estimation is reduced. More particularly, when the number of states is reduced to a degree necessary for a suitable reduction of the manufacturing costs, the reliability of the sequence estimation becomes inadequate.

The publication DE-Z: G. Zimmermann and W. Rupprecht: "Application of a Simplified Fano Metric to Adaptive Receivers for Digital Mobile Radio Systems", ETT. Vol. 5, No. 3, May-June 1994, pp. 65–70 discloses a receiver which includes an adaptive Whitened Matched Filter (WMF). This WMF is realized in a modified Kalman filter. After the coefficients of the channel impulse response have been determined by the equalizer, a new minimum-phase overall channel impulse response is generated by a convolution in the time domain or a multiplication in the frequency domain by the impulse response of a respectively adapted Kalman filter. This basic impulse response estimated from the so-called midamble, however, changes during the burst in response to the channel properties, so that the impulse response can neither be assumed to be known at the start nor at the end of the time slot. When the equalization is divided into forward and backward detection, the basic impulse response then has a minimum phase for the forward search in an extreme condition, whereas, a maximum-phase channel impulse response occurs during the backward search. In a reduced-state sequence estimation, this leads to erroneous detection. When equalization takes place in one direction only, that is, from the start of the burst to the end of the burst via the basic impulse response estimated on the basis of the midamble, and the basic impulse response at the start of the burst is not adapted to the unknown impulse response by means of iterative adjustment, this method also calls forth degradation.

SUMMARY OF THE INVENTION

It is an object of the invention to provide a receiver which permits of a reliable sequence estimation or single symbol estimation while providing a distinct state reduction of the sequence estimation method or single symbol estimation method.

According to the invention, this object is achieved in that for forming an estimate, a minimum-phase substitute system distorts the sample values received after a known training sequence in the sequence of sample values in the received order, and a maximum-phase substitute system distorts the sample values received before a known training sequence and to be processed in reverse order. For forming an estimate for a received signal, a sequence of binary symbols is distorted by a substitute system which copies the transmission channel. The reduced number of impulse response coefficients as a result of the state reduction, which are used for the estimation, render the estimation inaccurate. In a minimum-phase system, the first coefficients of the impulse response of the substitute system have maximum energy with an unchanged frequency response value. When these coefficients transformed in this way are used for the state reduction, nearly all the information is used for the estimation. This provides that the estimation reliability becomes similar to the case where the total number of states is used. In a maximum-phase substitute system, the last coefficients of the impulse response of the substitute system have maximum energy, so that for a reduced-state symbol estimation in the reverse direction, an estimation reliability which is similar to that of a total number of states is achieved.

When the substitute system is determined by means of a known training sequence, it copies the transmission channel with maximum exactness at that instant. Since the time-variant transmission properties have changed, also the substitute system is to be adjusted based on decisions. For minimizing the sequence estimation error caused by a change of the impulse response until the next estimation of the impulse response, a minimum-phase substitute system makes an estimation on the basis of the training sequence starting in positive direction i.e., the sample values received later in the sequence. Therefore, the greater part of the information for the description of the transmission channel is found in the first coefficients of the substitute system. A maximum-phase substitute system provides an estimation of the training sequence in negative direction for the same reason i.e., the sample values received earlier are distorted in reverse order by the maximum-phase substitute system. As a result, the larger part of the information for the description of the transmission channel is found in the last coefficients of the substitute system, so that a reliability similar to that of a complete number of states is achieved in a reduced-state sequence estimate in negative direction.

In an advantageous embodiment of the invention, there is provided that for forming the minimum or maximum-phase substitute system, at least one all-pass filtering is effected of the transmission channel impulse response estimated on the basis of the received training sequence. When the impulse response of the substitute system has been determined on the basis of the training sequence, the transformation in a minimum or maximum-phase substitute system is effected by means of an all-pass filtering. The noise power and the statistical independence of successive noise sample values are then unaffected. It is also possible to use an approximation of the all-pass filtering. For determining the all-pass filtering may be used, for example, the method of zero-crossing detection.

These and other aspects of the invention will be apparent from and elucidated with reference to the embodiments described hereinafter.

DESCRIPTION OF THE PREFERRED EMBODIMENTS

Figure 1:
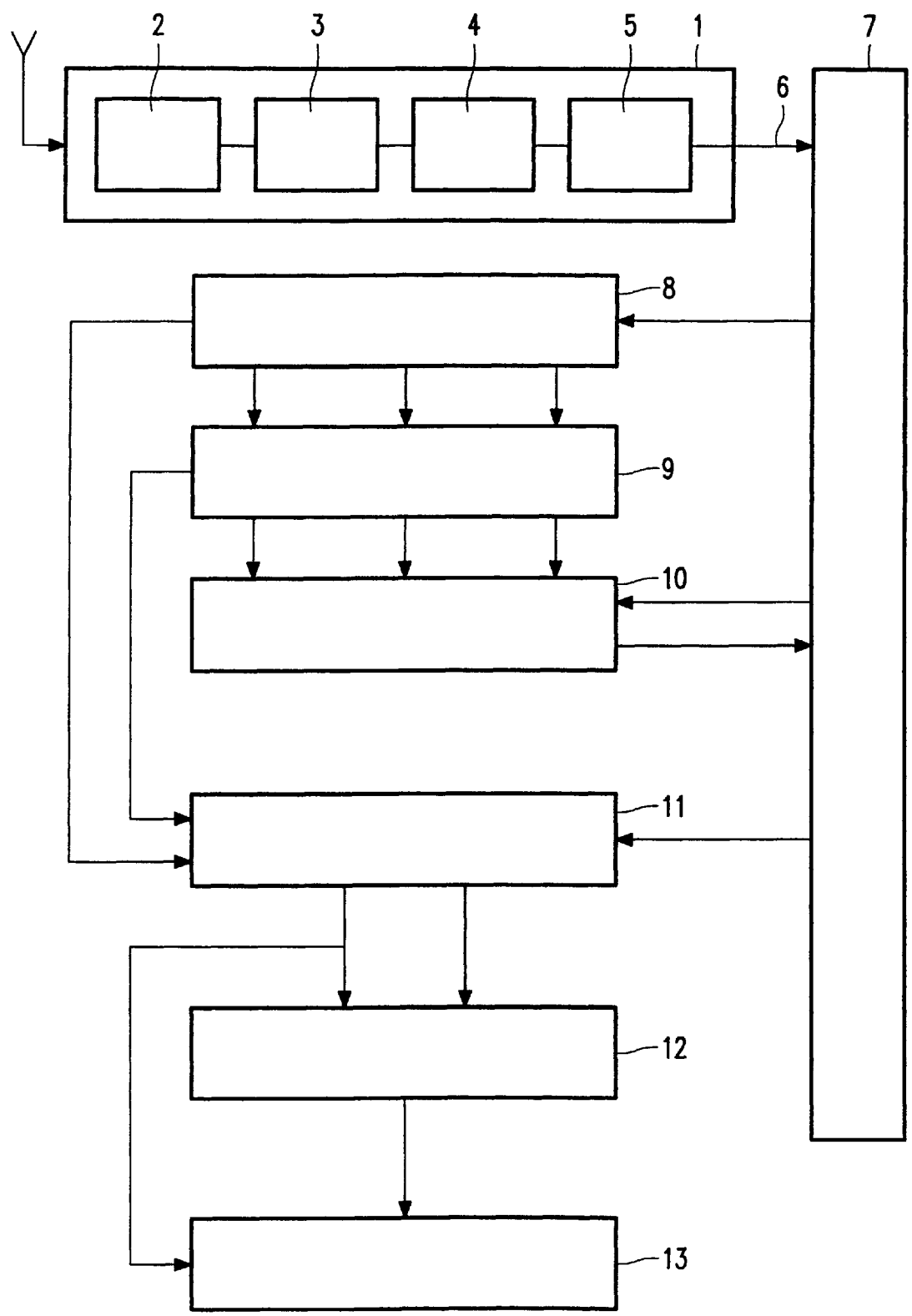
FIG. 1 shows a block circuit diagram of the receiver according to the invention of a digital transmission system.

FIG. 1 shows a receiver for a digital transmission system. In its receiver input stage 1, it comprises a high-frequency section 2, an IIQ demodulator 3, a band-limiting filter 4 and a sampler 5. The sample values $r_k$ 6 are stored in a digital memory 7. The data from this digital memory 7 are rendered available to the channel estimator 8. In the channel estimator 8, an impulse response of the transmission system is estimated via a known training sequence in the received signal. Based on this impulse response, an all-pass detection 9 takes place for converting the impulse response in the all-pass filter 10 in a minimum or maximum-phase system without a loss of accuracy of the estimation. For this purpose, the all-pass filter 10 first takes the sequence of the sample values 6 from the digital memory 7 and stores the filtered values again in the digital memory 7. With the aid of the coefficients of the impulse response of the transmission system, these coefficients being determined in the channel estimator 8, the symbol estimator 11 makes a symbol estimation with state reduction according to the Maximum Likelihood Sequence Estimation (MLSE) method via a Viterbi algorithm. Reliability information for the symbol estimation is then additionally formed, this information being optionally processed together with the estimated data in a decoder 12. When not only the data symbols themselves, but also the probability of their correct detection is available, a soft-decision decoding can be used in the decoder 12. The transmitted payload data 13 are formed therefrom.

On the transmission link situated between a transmitter and the receiver input stage 1, a transmitted signal is distorted by multipath propagation due to reflections and superpositioning of noise and further disturbing signals. As a result, a binary digit $b_k$ of a binary signal b transmitted at a discrete instant k is superimposed by delayed signal portions of binary digits $b_{k-1}$, $b_{k-2}$, ... transmitted earlier. This superpositioning corresponds to a signal distortion. Consequently, the signal received for a transmitted binary digit can no longer be assigned unambiguously to a low or a high level. In that case, the transmission channel has a memory size d, where d denotes the number of interfering adjacent symbols. The memory size d can also be defined as a quotient of the length of the channel impulse response of the transmission channel and a bit duration of the received signal minus 1, where the larger integer of this result denotes d. The signal received from the receiver input stage 1 has an analog signal which as a result of these superpositionings, which waveform cannot be assigned without equalization to the originally transmitted binary value. For this purpose, the signal received in the receiver input stage 1 is sampled by the sampler 5 at equidistant instants k.

The influence of already transmitted binary digits depends on the delay of the signal portions arriving delayed at a receiver input stage 1. After a certain time interval, which depends on the transmission channel characteristic, the influence is no longer essential and, therefore, needs no longer to be taken into account for the equalization. As a rule, the delay is expressed as a number of binary digits transmitted within this time interval. With this, each sample value $r_k$ 6 which can be assigned to a binary digit $b_k$ transmitted at an instant k depends on the binary digit $b_k$ which can be assigned to this sample value and d binary digits $b_{i-1}$, $b_{i-2}$, ..., $b_{i-d}$ immediately preceding this binary digit $b_k$.

Figure 2:
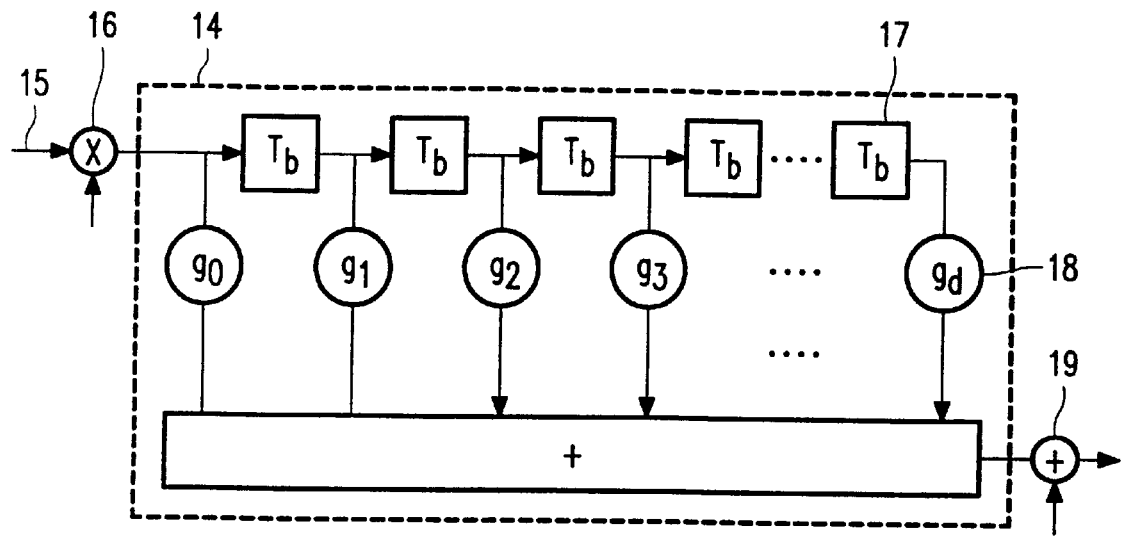
FIG. 2 shows a block circuit diagram of a substitute system describing the transmission channel, this system producing an impulse response for channel estimation.

A channel model, which approximately describes the dispersive transmission channel by a linear finite transversal filter, forms a basis for the equalization of a sequence of sample values 6 by means of the digital memory 7 which renders the sample values 6 available to the channel estimator 8 for the time interval of a transmit time slot. FIG. 2 shows a block circuit diagram of a substitute system 14 which corresponds to this transversal filter. The multiplication 16 of a binary signal 15 by $j^k$ corresponds to the $\pi/2$ shift 2PSK modulation used in mobile radio according to the GSM standard. An incoming sequence of binary symbols is read into the d memory cells of the substitute system 14 via delay elements 17. By means of the filter coefficients of the substitute system 14, the individual binary symbols are factored and the values obtained are subsequently summed together. An addition 19 of white, discrete-time, complex noise forms output values of the substitute system 14 which are copied from the sample values 6 actually recovered from the dispersive transmission channel in the receiver input stage 1. The times of the delay elements 17 then correspond to the equidistant distances of successively sent binary symbols. In this manner, attempts are made at the receiving end to copy the transmission properties of the transmission channel via suitable filter coefficients. For example, the distortions occurring on the transmission path are copied by the substitute system 14 by the linear combinations which have memories. The transmission channel is copied by respectively setting the filter coefficients 18. The filter coefficients 18 can then be derived from the sample values 6 of an estimated impulse response of the transmission channel. For this purpose, for example a so-termed training sequence can be used, which comprises a binary symbol sequence known both to a transmitter and a receiver. Each time the training sequence is received, the filter coefficients 18 are set so that, once the substitute system has been traversed, a copy is made of the transmission channel that has the fewest errors.

Figure 3:
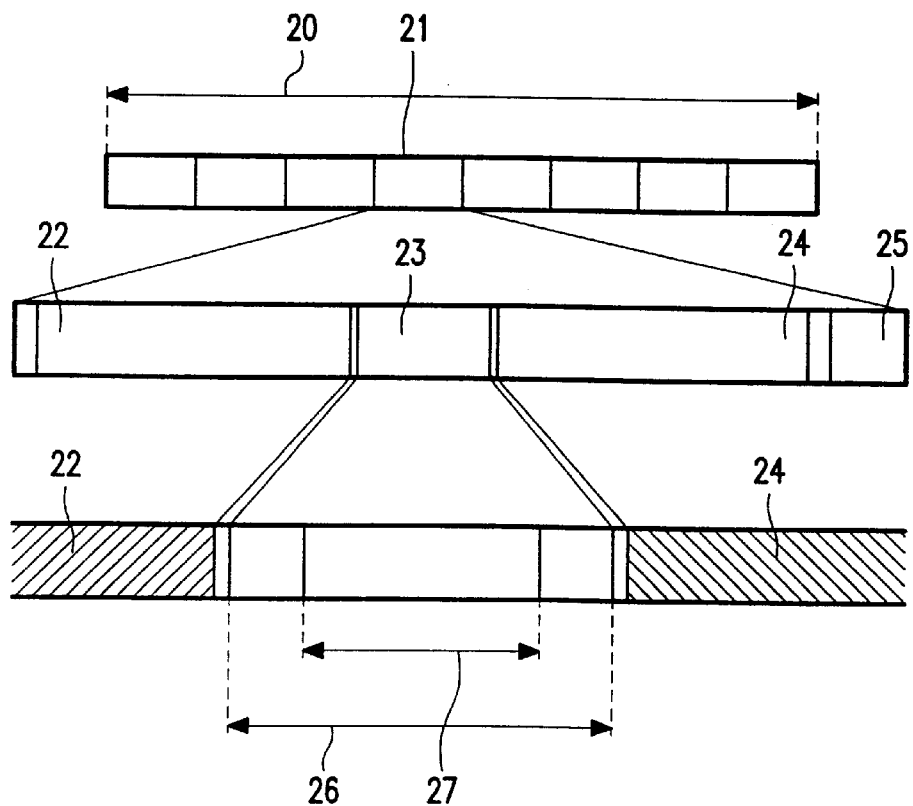
FIG. 3 shows the structure of a TDMA frame in GSM mobile radio with the structure of a single time slot which time slot contains a training sequence necessary for the channel estimation.

FIG. 3 shows a structure of a TDMA frame 20 used in mobile radio according to the GSM standard. In a frame 20 having a length of 4.615 ms, there are accommodated 8 information channels which each have a time slot 21, so that the channels are each assigned 0.577 ms in which 159 bits are sent. The middle part of the bit sequence of a time slot forms a so-called midamble 23 having 26 bits which are framed by a so-called housekeeping bit. To the exterior the two sides each have 57 information bits 22 and 24 followed each by 3 so-called tail bits. At the end of the time slot there is a guard interval 25. The midamble 23 contains in the middle a so-called training sequence 27 having 16 bits, this sequence being known both in the transmitter and in the receiver. The training sequence 27 in mobile radio according to the GSM standard is extended on either side by five bits. For a periodic extension of the training sequence on either side, the extension is known and this is called an extended training sequence 26.

The equalization method in the receiver according to this invention, which method can be realized with hardware components and via a software solution, comprises the following components:
1. Extended channel estimation
2. All-pass detection
3. All-pass filtering
4. Sequence estimation with a reduced number of states including a determination of the reliability of individual symbols.

FIG. 1 shows the block circuit diagram of the proposed receiver for mobile radio according to the GSM standard. This equalization method may be applied both to the base station and to the mobile stations.

In the receiver input stage 1, a sequence ($r_k$), k$\in$Z, of complex sample values 6 in the baseband is recovered from the high-frequency input signal in similar fashion to that of the state of the art. Then, k denotes the discrete time in the clock of the binary transmit symbols 15. The GMSK modulation method of GSM is approximated, as usual, at the receiving end as $\pi/2$ shift 2PSK modulation and accordingly demodulated in linear fashion. Between the transmitting-end sequence ($b_k$) of binary symbols 15, which are represented in bipolar fashion by the amplitude coefficients $b_k \in \{-1; +1\}$, and the sequence ($r_k$) of the receiving-end sample values 6, the effects of GMSK modulation, linearly distorting transmission channel, additive noise, I/Q demodulation, band limitation and sampling can very well be modeled by a discrete-time substitute system 14 having degree d and complex-value coefficients 18, and an addition of discrete-time white complex-value noise 19 according to FIG. 2. In FIG. 2, $T_b$ in the delay elements 17 denotes the distance in time between two binary symbols ($T_b=1/(270.833$ kHz)). The multiplication 16 of the binary symbol sequence by $j^k$ ($j:=\sqrt{(-1)}$, (imaginary unit) describes the $\pi/2$ shift 2PSK modulation. The substitute system 14 contains d binary memory cells which contain the amplitude coefficients $\pm 1$ and $\pm j$ alternating with time. In this manner, $2^d$ different memory states of the delay line of the substitute system 14 are possible in each step.

The sequence ($r_k$) of complex sample values 6 is stored and off-line processed in real time. The sequence is added to the extended channel estimation as shown in FIG. 1. Based on the extended training sequence 26 of 26 binary symbols in the middle of a so-called GSM burst (midamble 26), the time position of the sample values, the degree d of the currently available distorting substitute system 14 as shown in FIG. 2, and its complex-value coefficients 18 are determined. The z-transform of the estimated sequence ($\hat{g}_i$); $i \in \{0,1, \ldots, d\}$ of filter coefficients $\hat{g}_i$ is denoted $$\hat{G}(z) = \sum_{i=0}^{d} \hat{g}_i \cdot z^{-i}$$

In the unit "all-pass detection" 9, the impulse responses or transfer functions $A(z)$ and $\overline{A}(z)$ of two all-pass systems are detected, so that the resulting system $\hat{G}(z) \cdot A(z)$ has a minimum phase and $\hat{G}(z) \cdot \overline{A}(z)$ has a maximum phase. The degree of the resulting systems then ideally does not increase. Only, if, instead of the required all-pass transfer functions, approximations thereof are used, can a (slight) increase of degree occur.

The signal ($r_k$) 6 is filtered in positive direction by the system $A(z)$ and, in negative direction, by the system $\overline{A}(z)$, beginning from the middle of the burst, thus starting from the training sequence 27. If a decision-based adjustment of the channel estimation is omitted, only a filtering of the total signal ($r_k$) 6 is needed for one burst.

The symbol sequence is determined by means of a sequence estimation method with state reduction, preferably beginning in the middle of the burst in positive direction on the basis of the signal distorted by a minimum-phase substitute system, and, in negative direction, on the basis of a signal distorted by a maximum-phase substitute system. Optionally, the sequence estimation method with state reduction and detection of symbol reliability 11 in accordance with this invention can be used for this purpose (see item 4). A decision-supported adjustment of the channel estimation 8 may then be effected in like manner to that of the state of the art.

If this is dispensed with, a continuous estimation of the symbol sequence with state reduction 11 of the whole burst in a direction (preferably in a positive direction) beginning from the start (or end respectively, in the case of negative direction) of the sequence ($r_k$) filtered only with the all-pass transfer function $A(z)$ (with $\overline{A}(z)$ in the case of a negative direction) is possible. The known data symbols of the extended training sequence 26 may then be used similarly to a sequence estimate in two directions for the respective half burst to enhance the reliability (use of a priori probabilities 0 or 1, respectively).

Re 1. Extended channel estimation:
Whereas in the state-of-the-art method, a channel estimation 8 is only possible for substitute systems 14 $\hat{G}(z)$ shown in FIG. 2, having degree d=5, there is proposed to adapt the channel estimation method to the respective system to be estimated. This not only achieves that even for higher degrees, thus for larger delay differences in the multipath propagation of the signal, only one channel estimation becomes possible, but at any rate a channel estimation with a maximum value follows, that is, with a minimum variance of the estimation error.

The extended channel estimation is based on a channel estimation for the variable expected degree c of the substitute system 14. The c+1 coefficients of the system with expected degree c $$[\hat{g}(c)] = (\hat{g}_0(c), \hat{g}_1(c), \ldots, \hat{g}_c(c))$$

are determined by the transformation $$[\hat{g}(c)] = [y(c)] \cdot \phi^{-1}(c)$$

The c+1 components $y_k(c)$ of the vector $[y(c)]$ are then (as usual) formed by correlation of the sequence ($r_k$) of complex sample values 6 from the received signal having the coefficients of a part of the (periodically extended) training sequence 26 ($a_k$):

$$y_k(c) = \sum_{i=k_u(c,k)}^{k_o(c,k)} r_{i+k} \cdot a_i^*; \quad k \in \{0, 1, \ldots, c\}$$

For simplicity of the representation, the discrete instant k=0 is used for the expected beginning of the training sequence 27 in the received sequence ($r_k$). The two summation limits $k_u(c,k)$ and $k_o(c,k)$ are generally functions of the degree c and of the time index k. A possible selection of these summation limits is:

$k_o(c, k) = 25 - c$ $k_u(c, k) = c$, which is advantageous in that the summation for all instants k is effected over as many elements. It may also be wise to choose the different summation limits for different discrete instants k in the clock of the binary symbols. For example, at the beginning of the extended training sequence 26, a long sequence of sample values could be correlated with, and for following instants k, the lower summation limit $k_u$ could be incremented. For the extended training sequence 26, similarly to the data sequence, is to be taken into account the interpretation of GMSK as $\pi/2$ shift 2PSK modulation, thus a multiplication 16 of the binary, bipolar extended training sequence 26 by $j^k$.

The matrices $\phi^{-1}(c)$ are the inverse values of (c+1) x (c+1) matrices $$\phi(c) = \begin{pmatrix} \phi_{00}(c) & \phi_{01}(c) & \phi_{02}(c) & \ldots & \phi_{0c}(c) \\ \phi_{10}(c) & \phi_{11}(c) & \phi_{12}(c) & \ldots & \phi_{1c}(c) \\ \vdots & & & & \\ \phi_{c0}(c) & \phi_{c1}(c) & \phi_{c2}(c) & \ldots & \phi_{cc}(c) \end{pmatrix}$$

having the elements $$\varphi_{kl}(c) = \sum_{i=k_u(c,k)}^{k_o(c,k)} a_{i+l-k} \cdot a_i^*,$$

which represent the cross-correlated values between the extended training sequence 26 ($a_k$) and a shortened version. The matrices $\phi^{-1}(c)$ are then easy to calculate. They are preferably for $0 \leq c \leq 7$ for all 8 training sequences used in GSM mobile radio stored in a ROM in the proposed receiver. In this manner, their real-time calculation is omitted.

By multiplying the vector [y(c)] by the matrix $\phi^{-1}(c)$, the influence of non-fading values of the cross-correlated $\phi_k(c)$ with $k \neq 0$ and $c \neq 5$ is raised to the channel estimation. The training sequences in GSM mobile radio are selected, as is known, so that especially for c=5, the following holds:

$\phi^{-1}(5) = \phi(5) = E_6$, where $E_6$ denotes the 6×6 unit matrix.

Only in this special case for c=5, which is exclusively used for the state-of-the-art channel estimation, may the matrix multiplication be omitted. The limitation to c=5 used thus far is certainly the cause of the following disadvantages:

Only the coefficients of the substitute system 14 up to a maximum of degree c=d=5 can be estimated. Thus the channel estimation 8 fails when higher delay differences occur with a multipath propagation of the signal, or a shift of the estimated instant k=0 as against the actual beginning of the training sequence 27.

When, in reality, a smaller degree than 5 of the substitute system 14 shows up, the variance of the estimation error is unnecessarily large.

By multiplying the vector [y(c)] by stored matrices $\phi^{-1}(c)$ according to the invention, a channel estimation for expected degrees $0 \leq c \leq 13$ becomes possible. For c>7, certainly the variance of the estimation error clearly increases, so that a limitation to $0 \leq c \leq 7$ is to be recommended in practice.

The extended channel estimation 8 is preferably as follows:

First a channel estimation for a high expected degree (for example, c=7) is calculated, to determine the actual degree and the position of the zero instant. Advantageously, a window can be determined for coefficients to be evaluated in the following, so that the values of estimated coefficients outside this window do not considerably exceed the computational tolerance of the estimation error (coefficient clipping).

For a second channel estimation, the expected degree c determined in the first attempt and the optimum position of the zero instant are used. In this manner, the variance of the estimation error is minimized.

Due to the twofold computation of estimated filter coefficients 18, a channel estimation 8 is achieved which is adapted to the zero instant and degree of filtering. The additional cost necessary for this purpose only stands for a second matrix multiplication.

Re 2. All-pass detection:

For the estimated discrete-time substitute system $\hat{G}(z)$ 14, two (or one, respectively) all-pass filters $A(z)$ and $\tilde{A}(z)$ are calculated via which minimum and maximum-phase overall systems arise. For all-pass detection 9, all current and recently proposed methods for factoring of $G(z) \cdot G^*(z^{*-1})$ can be used in a minimum-phase and maximum-phase part such as shown, for example, in "An Alternative Approach to Minimum Mean-Squared Error DFE with Finite Length Constraints", W. Gerstacker, International Journal of Electronics and Communications (AEÜ), Vol. 50 (No. 1), 1996, or "Zeitdiskrete Signalverarbeitung", A. V. Oppenheim and R. W. Schafer, Oldenbourg Verlag, Munich, Vienna, 1992.

Methods starting from the logarithm of the frequency response, the so-called Cepstrum, prove to be highly advantageous.

Re 3. All-pass filtering:

The all-pass filtering 10 achieves that with respect to the sequence estimation with state reduction 11, a linear distortion of the data signal occurs caused by a minimum-phase or maximum-phase respectively, discrete-time substitute system 14 having degree c.

Only when the energy of the difference signal when two paths in a trellis diagram are split up is maximized, which trellis diagram can be drawn similarly to FIG. 2 for binary input symbols for the system 14 (see, for example, "Trelliscodierung in der digitalen Übertragungstechnik—Grundlagen und Anwendungen", J. Huber, Springer Verlag, Berlin, 1992), are signal-to-noise ratios caused by a state reduction in the sequence estimation negligibly small even for a drastic reduction.

If no decision-supported adjustment of the channel estimation 8 is made on the basis of the training sequence 27, an all-pass filtering 10 of the whole sequence $(r_k)$ by the system $A(z)$ for generating a signal distorted by a minimum-phase substitute system 14 will suffice, because the sequence estimation in positive direction can be effected over the whole burst. If, however, a decision-supported adjustment of the channel estimation 8 is made during the sequence estimation method, the part of the sequence $(r_k)$ of sample values 6 can be filtered out of the received signal converted into the baseband, starting with the training sequence 27 in positive direction by the system $A(z)$, whereas the part in negative direction can be filtered by the system $\tilde{A}(z)$. Starting from the training sequence 27, the sequence estimation 11 is in that case made separately in positive and in negative direction. In either case, the all-pass filtering 10 achieves that the difference signal has maximum energy at the path split ups in the trellis diagram. The all-pass filtering 10 can be effected with any of the linear signal transformation methods customary in digital signal processing, for example, in the time domain by means of a discrete convolution with a FIR or IIR system, or by means of a discrete Fourier transformation, multiplication by the transfer function computed under item 2 in the frequency domain and, successively, inverted Fourier transformation.

Re 4. Sequence estimation with reduced number of states:

All current methods of reducing the number of states for the sequence estimation of digital pulse amplitude-modulated signals, which signals are affected by impulse interference due to distortions, can be implemented, see, for example, "Delayed decision-feedback sequence estimation", A. Duel-Hallen and C. Heegard, IEEE Transactions on Communications, Vol. 37, No. 5, pp. 428–436, 1989. Preferably, the Decision-Feedback Sequence Estimation method discussed there is to be used in which a trellis diagram of the first $c_o$ binary delay elements of the substitute system 14 is formed with $2^{c_o}$ states. For computing the metric in the Viterbi algorithm, the further coefficients 18 of this system are estimated by the symbols in the path registers at the respective states in the trellis diagram.

For the following channel decoding 12, it is helpful not only to estimate the channel symbols, but also their reliability, to be able to carry out so-called soft-decision decoding. In addition to determining the respective symbol, also the probability that this decision is correct can be determined. A sequence estimation method with state reduction and approximate calculation of the symbol reliabilities was shown, for example, in "TCM on Frequency-Selective Fading Channels: A Comparison of Soft-Output Probabilistic Equalizers" P. Höher, in Proceedings of the GLOBECOM 1990, pp. 401.4.1–401.4.6, San Diego, December 1990.

An optimum method of calculating the a posteriori probabilities of the input symbols of a trellis coder (in this specific case of a linearly distorting system 14), while taking its output symbols distorted by white noise 19 into account, is the algorithm for the maximum a posteriori single symbol estimation according to Bahl et al., see, for example, "Optimal decoding of linear codes for minimizing symbol error rate", L. R. Bahl, J. Cocke, F. Jelinek, and J. Raviv, IEEE Transactions on Information Theory, IT-20: pp. 284–287, 1974. In this algorithm, the probabilities $\alpha_\gamma(i)$ for the states i=1, 2 . . . Z at step $\gamma$, while taking the trellis code output signals observed thus far $\gamma-1$ into account, are determined by means of a forward recursion, and probabilities $\beta_\gamma(i)$ for the trellis coder output symbols observed between the latest step L back to the step $\gamma$ with an assumed state i in the current step $\gamma$ are determined by means of a backward recursion, see, for example, "Trellis codierung in der digitalen Übertragungstechnik—Grundlagen und Anwendungen", J. Huber, Springer Verlag, Berlin 1992. In this manner, regarding the whole received sequence, the state probabilities $\Psi_\gamma(i)$ for the state i at step $\gamma$ $\Psi_\gamma(i) = \alpha_\gamma(i) \cdot \beta_\gamma(i)$ hold. With the trellis coder used, the symbol probabilities directly follow from the state probabilities.

According to "Optimum and the Sub-Optimum Detection of Coded Data Disturbed by Time-Varying Intersymbol Interference", W. Koch and A. Baier, in Proceedings of the GLOBECOM 1990, pp. 807.5.1–807.5.6, San Diego, 1990 and "TCM on Frequency-Selective Fading Channels: A Comparison of Soft-Output Probabilistic Equalizers" P. Höher, in Proceedings of the GLOBECOM 1990, pp. 401.4.1–401.4.6, San Diego, December 1990, the Bahl algorithm can be a reduced-state one similarly to the decision feedback Viterbi algorithm. With the forward recursion for calculating the $\alpha_\gamma(i)$, a path register is assigned to each of the current $2^{c_o}$ states, which path register is updated in each time window as with the DFSE algorithm, and is necessary for computing the branch metrics of the reduced trellis. The branch metrics are stored and used once again for the backward recursion to determine the $\beta_\gamma(i)$.

We claim:

1. A receiver comprising:

an equalizer which forms an estimate of transmitted symbols from a sequence of sample values of a received signal distorted by a transmission channel;

a minimum-phase substitute system which processes in a received order the sample values to distort a first set of the sample values, said first set being received after a known training sequence in the sequence of sample values; and a maximum-phase substitute system which processes in a reverse received order the sample values to distort a second set of the sample values, said second set being received before said known training sequence.

2. The receiver of claim 1, wherein said minimum-phase substitute system comprises at least one all-pass filter for filtering an impulse response of the transmission channel, said impulse response being estimated using said known training sequence and a received training sequence.

3. The receiver of claim 1, wherein said maximum-phase substitute system comprises at least one all-pass filter for filtering an impulse response of the transmission channel, said impulse response being estimated using said known training sequence and a received training sequence.

4. The receiver of claim 1, wherein said estimate is formed by implementing a reduced-state sequence estimation method.

5. The receiver of claim 1, wherein said estimate is formed by implementing a reduced-state single symbol estimation method.

* * * * *